United States Patent [19]

Togneri

[11] Patent Number: 4,639,724

[45] Date of Patent: Jan. 27, 1987

[54] GRAPHIC DISPLAY

[76] Inventor: Mauro G. Togneri, P.O. Box 12818, Houston, Tex. 77017

[21] Appl. No.: 946,398

[22] Filed: Sep. 27, 1978

Related U.S. Application Data

[63] Continuation of Ser. No. 688,398, May 20, 1976, abandoned.

[51] Int. Cl.[4] ............................................. G08B 5/00
[52] U.S. Cl. ............................................... 340/815.01
[58] Field of Search .................. 40/126, 615; 340/225, 340/366 B, 381, 382

[56] References Cited

U.S. PATENT DOCUMENTS

| | | | |
|---|---|---|---|
| 2,334,418 | 11/1943 | Land | 340/383 UX |
| 3,107,350 | 10/1953 | Arrasmith | 340/382 |
| 3,110,020 | 11/1963 | Abenoroth | 340/225 |
| 3,530,615 | 9/1970 | Meyer | 46/16 |
| 3,539,987 | 11/1970 | Greene | 340/27 |
| 3,573,568 | 4/1971 | Siegel | 317/23 X |
| 3,582,927 | 6/1971 | Primavera | 340/225 |
| 3,624,648 | 11/1971 | Willoughby | 340/381 |
| 3,711,789 | 1/1973 | Dierschke | 331/94.5 P |
| 3,751,319 | 8/1973 | Green | 40/615 |
| 3,754,244 | 8/1973 | Garrett | 340/381 |
| 3,754,245 | 8/1973 | Peprnik | 340/381 |
| 3,845,468 | 10/1974 | Smith | 340/148 |
| 3,863,251 | 1/1975 | Gould | 340/382 |
| 3,914,761 | 10/1975 | Murase | 340/366 B |
| 3,949,504 | 4/1976 | Wills | 40/575 |

OTHER PUBLICATIONS

Publication of Beta Products in *Control Engineering*, Jul., 1975.
Brochure of Beta Products, data sheet Iosoga, Feb., 1974.
Brochure of the Scam Instrument Corporation, bulletin H667.
IBM Technical Disclosure Bulletin, vol. 10, No. 8, "Visible Light Emitting-Diode", Jan., 1968.

*Primary Examiner*—Harold I. Pitts
*Attorney, Agent, or Firm*—David M. Ostfeld

[57] ABSTRACT

A graphic display system, including a uniquely designed three or four element structure, forming a semigraphic display and associated electronic components, such components being mounted in fixed relation to the semi-graphic display, for permitting the use of high density, non-illuminated, semi-graphic displays while retaining the information capability of a full functional graphic. The system includes a frame designed to support structural elements therein and to protect electrical wiring connected between electrical components mounted upon one of the elements, a matrix board. These electrical components include light sources such as light emitting diodes. In a first and second embodiment a circular polarizer screen and a transparent screen are located in front of the matrix board. The circular polarizer, which may be located in direct contact with the transparent screen, is adapted to block incident light transmitted through the polarizer from being reflected. The transparent front screen is sized to protect the polarizer and is embossed, etched or silk screened with semi-graphic information to be displayed by the system. In a third embodiment, only a transparent screen is located in front of the matrix board. The transparent screen is back silk screened in an opaque color, leaving only the semi-graphic portion transparent. The semi-graphic portion may then be back pointed in other colors, leaving transparent portions or holes for the light sources. A photoelectric device may also be used to regulate the intensity of the light sources.

20 Claims, 8 Drawing Figures

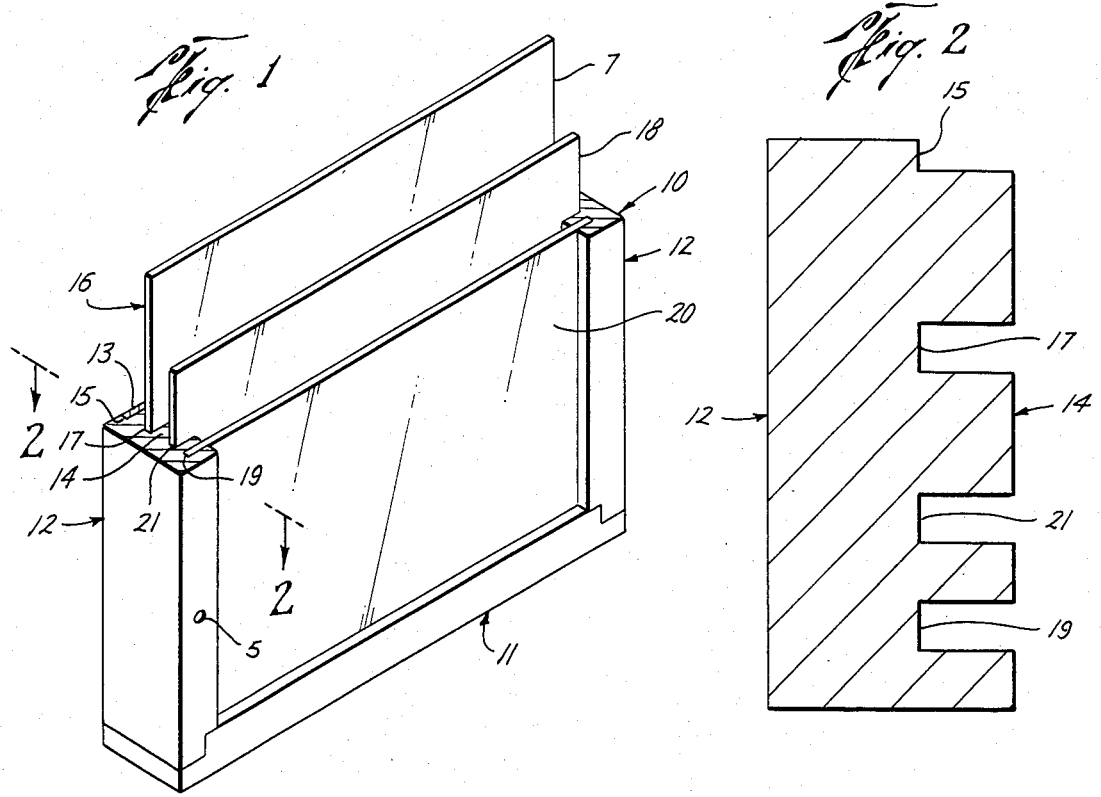
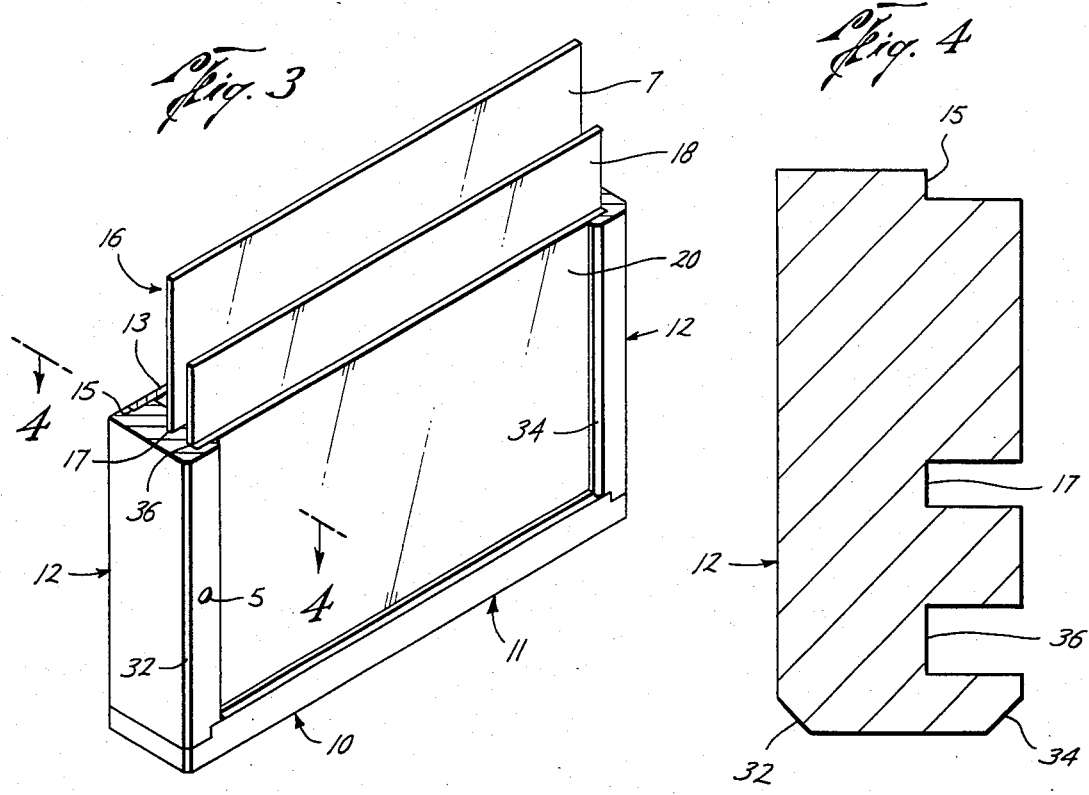

GRAPHIC DISPLAY

This is a continuation of application Ser. No. 688,398, filed May 20, 1976, now abandoned.

BACKGROUND OF THE INVENTION

1. Field of the Invention

The present invention relates to a graphic display system permitting the use of the high density characteristics of non-illuminated, semi-graphic displays while also permitting the high information capability of a full functional graphic. The present invention has been found to be particularly useful in the control system panel board art, and hence will be discussed with particular reference thereto. However, the present invention is also applicable to other types of graphic display systems requiring high contrast, high visibility and high resolution display.

2. Description of the Prior Art

Several types of indicator/display systems have been known and used before, and typical examples thereof are shown in U.S. Pat. No. 3,754,245, issued Aug. 21, 1973, to H. O. Peprnik, entitled "SYSTEM INDICATOR BOARD"; U.S. Pat. No. 3,110,020, issued Nov. 5, 1963, to K. W. Abendroth, entitled "TRACT DIAGRAM PANEL FOR RAILWAY TRAFFIC CONTROLLING SYSTEMS"; U.S. Pat. No. 3,530,615, issued Sept. 29, 1970, to B. C. Meyer, entitled "ILLUMINATED DESIGN SET"; U.S. Pat. No. 3,582,927, issued June 1, 1971, to G. Primavera, entitled "POWER NETWORK DISPLAY PANELS AND CONTROLS"; U.S. Pat. No. 3,624,648, issued Nov. 30, 1971, to J. G. Willoughby, entitled "GRAPHIC DISPLAY ANNUNCIATOR"; U.S. Pat. No. 3,754,244, issued Aug. 21, 1973, to R. H. Garrett, entitled "GRAPHIC DISPLAY ASSEMBLY"; publication of *Beta Products* in "Control Engineering", July, 1975; brochure of *Beta Products*, Data Sheet 1050GA, February, 1974; and brochure of The Scam Instrument Corporation, Bulletin H667, copyrighted 1967.

Several types of light emitting diode devices have been known and used before, and typical examples thereof are shown in U.S. Pat. No. 3,573,568, issued Apr. 6, 1971, to H. B. Siegel, entitled "LIGHT EMITTING SEMICONDUCTOR CHIPS MOUNTED IN A SLOTTED SUBSTRATE FORMING A DISPLAY APPARATUS"; U.S. Pat. No. 3,711,789, issued Jan. 16, 1973, to E. G. Dierschke, entitled "DIODE ARRAY ASSEMBLY FOR DIODE PUMPED LASERS"; and IBM Technical Disclosure Bulletin, Vol. 10, No. 8, January, 1968, entitled "Visible Light Emitting Diode".

Several types of polarizers have been known and used before, and a typical example thereof is shown in U.S. Pat. No. 2,334,418, issued November 16, 1943, to E. H. Land, entitled "SIGNAL LIGHT CONSTRUCTION".

Several types of photoelectric devices have been known and used before to regulate light, and a typical example thereof is shown in U.S. Pat. No. 3,539,987, issued Nov. 10, 1970, to L. M. Greene, entitled "AUTOMATIC REGULATOR FOR ANNUNCIATOR LIGHTS IN AIRPLANE COCKPITS".

None of this art discloses the combiation of electronic light sources and electronic components mounted to a matrix backboard in alignment with a semi-graphic display, nor the combination of electronic light sources mounted to a backboard in alignment with a semi-graphic display wherein there is means for protecting them from interference with each other, nor the combination of electronic components and light sources in a semi-graphic display wherein reflective light is inhibited, nor a display unit capable of mounting directly on a panel, nor combinations of semi-graphic displays and nonreflective techniques in conjunction with light sources, nor the use of opaque silk screening and paint to make a semigraphic display.

SUMMARY OF INVENTION

The present invention uses a very simple but highly effective design to make up a full display frame in which is mounted a matrix board having a matrix grid of holes adapted for receiving electrical components, the location of the components being identified by matrix hole location. The electronic display modules mounted on the matrix board make it feasible to manufacture the system as a thin surface mounted display package that does not require large panel cutout or forced cooling. A transparent screen in combination with coatings or polarizers is mounted in front of the matrix board for permitting semi-graphic overlays or other apparatus to be displayed while preventing incident light from being glaringly reflected. The present invention utilizes the matrix board to locate the electronic display components with respect to the nonilluminated semi-graphic displays on the transparent surface.

BRIEF DESCRIPTION OF THE DRAWINGS

For a further understanding of the nature and objects of the present invention, reference should be had to the following detailed description, taken in conjunction with the accompanying drawings, and in which like parts are given like reference numerals and wherein:

FIG. 1 is a perspective view of the first embodiment of the apparatus of the present invention showing the matrix board, circular polarizer and transparent member being assembled into the frame;

FIG. 2 is a side, cross-sectional view of the embodiment of FIG. 1 taken along section lines 2—2 of FIG. 1;

FIG. 3 is a perspective view of the second embodiment of the apparatus of the present invention showing the matrix board and the combination circular polarizer and transparent member being assembled into the frame;

Figure 5:
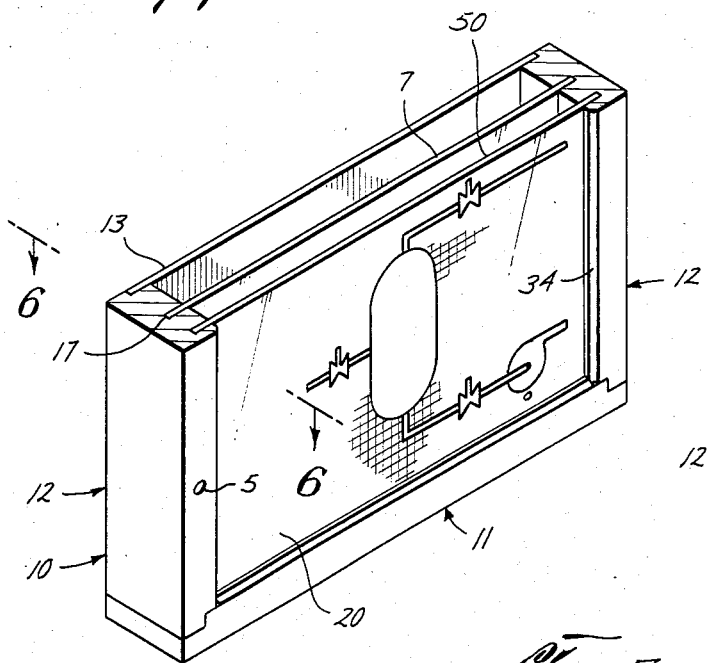
Figure 6:
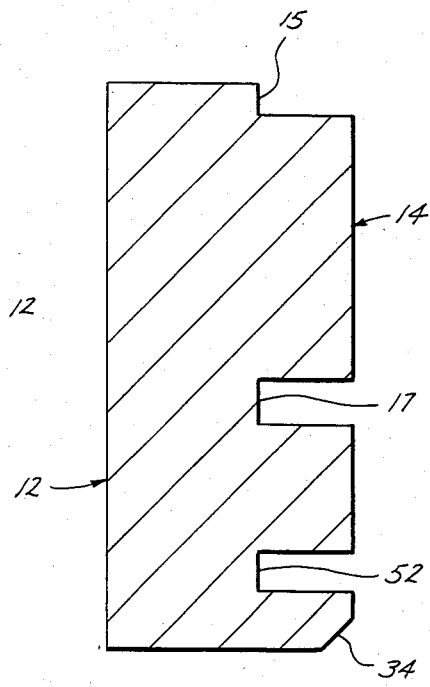
Figure 7:
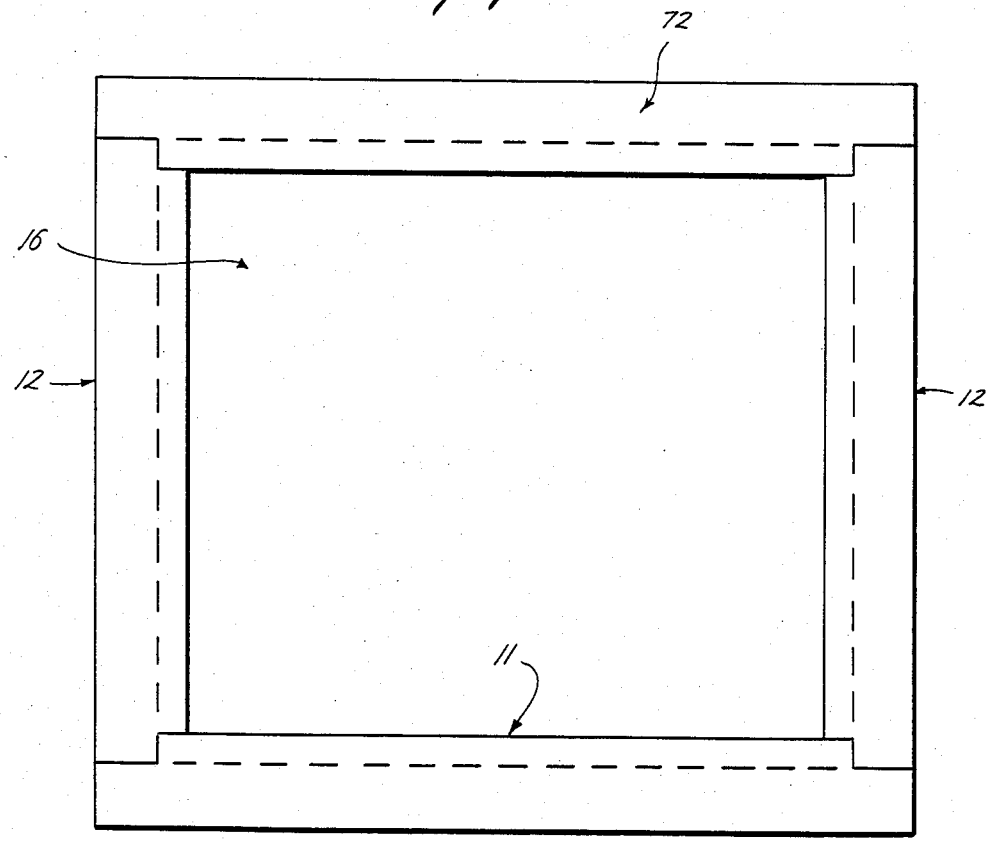
Figure 8:
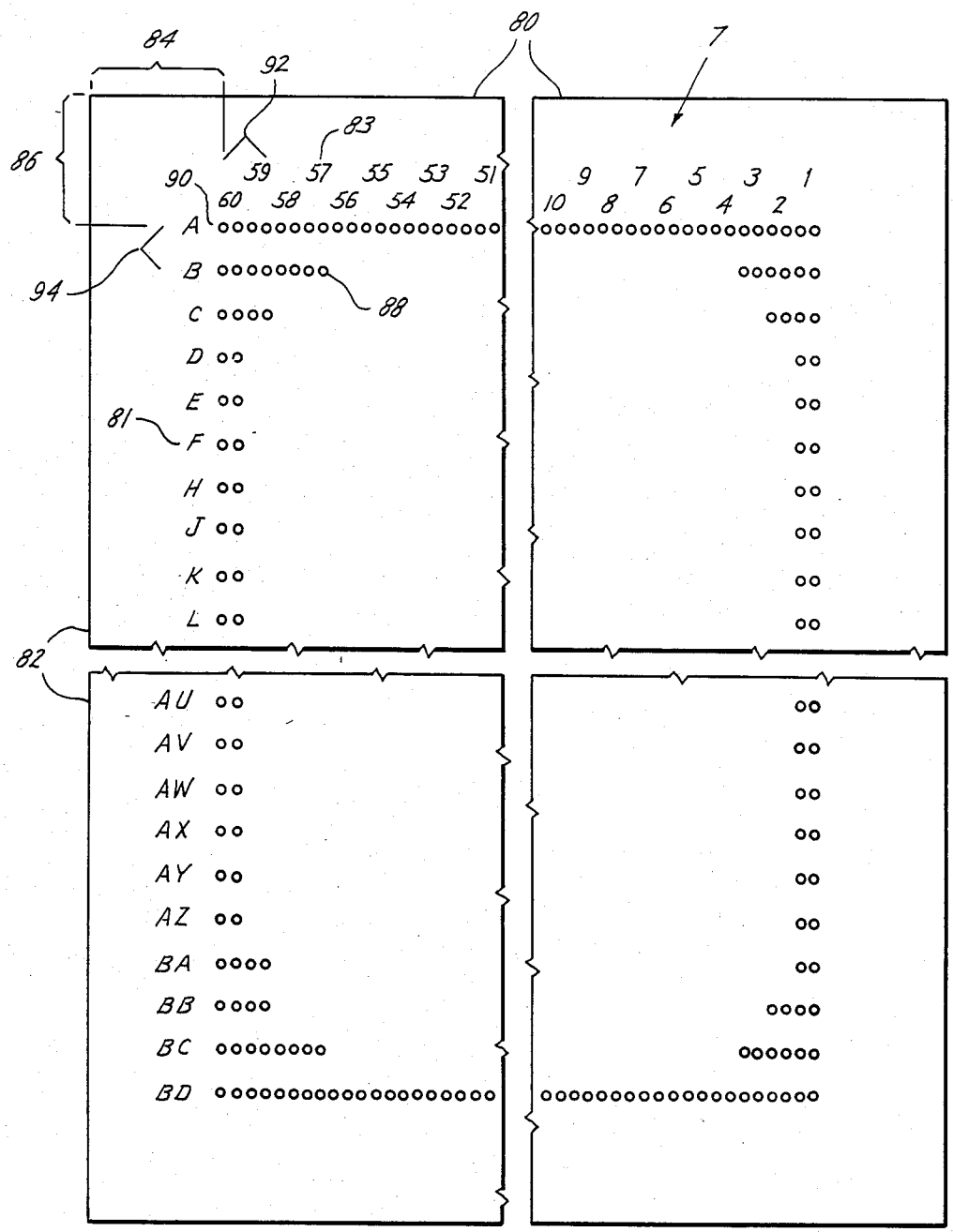

FRAME 4 is a side cross-sectional view of the embodiment of FIG. 3 taken along section lines 4—4 of FIG. 3;

FIG. 5 is a perspective view of the third embodiment of the apparatus of the present invention showing the matrix board and a non-illuminated, semi-graphic front member adapted to prevent incident light from being reflective therethrough;

FIG. 6 is a side cross-sectional view of the embodiment of FIG. 5 taken along section lines 6—6 of FIG. 5;

FIG. 7 is a front elevated view of any of the embodiments of the apparatus of the present invention; and FIG. 8 is a front elevated view of the matrix board of any of the embodiments of the apparatus of the present invention.

DETAILED DESCRIPTION OF THE PREFERRED EMBODIMENT

Introduction

The embodiments of the present invention of the graphic display may be used to display information wherein it is important that the display have high contrast, high visibility and high resolution. A particularly important area of application of the present invention is in process control displays to plant operators wherein it is particularly useful to use high density, non-illuminated, semi-graphic displays while retaining the high information capability of a full functional graphic display. However, it should be realized that the present invention could be applied to, for example, any application where it is desired to display information with high contrast and visibility.

In two embodiments of the present invention, the display is a combination of light sources, such as light-emitting diodes, and other electronic components connected by wire wrap or other technology, a transparent screen, and polarizing filters. The emitting characteristics of the light-emitting diode, overlays on the transparent screen, and the property of the polarizing filter are used to reject reflected incident light and produce a high contrast, high visibility, and high resolution display. In a third embodiment of the present invention, the display is a combination of light sources such as light-emitting diodes and other electronic components connected by wire wrap or other technology, a transparent screen having opaque silk screening over its inner surface, except for the semi-graphic pattern, and painting of the semi-graphic pattern. This method of applying a semi-graphic pattern to a screen lowers the cost of the display system by eliminating the polarizing filters and the necessity for multicolor silk screening of the semi-graphic portion of the display. The emitting characteristics of the light emitting diodes and the opaque properties of the silk screening are used to reject incident light and produce a high contrast, high visibility and high resolution display.

Structure and its Method of Use

Referring generally to FIGS. 1-8, there is shown a display unit comprising a frame 10 including bottom 11, sides 12 and back 13. Slots 14 are cut in sides 12 for sliding, receiving and holding plates 16 of various materials. Back 13 is mounted in slot 15 cut in sides 12.

Frame 10 is made of metal or plastic of sufficient strength to support plates 16 therein. It may be molded as one piece or in separate pieces attached together or otherwise shaped to form such a holder. The dimensions of frame are, for example, suitable to support displays ten or sixteen inches high, sixteen or twenty inches wide, and one and three-fourths inches deep.

Referring to FIG. 7, there is shown the front view of the graphic display. Sides 12 of frame 10 may be straight or beveled at the edges. Frame 10 further includes top cover 72 placed over plates 16 to hold them in place.

Frame 10 may further include mounting brackets (not shown) for mounting frame 10 on external surfaces.

Referring to FIGS. 1-6, Plates 16 include matrix board 7. Matrix board 7 may be made of epoxy and fiber glass or other suitable material. Matrix board 7 is used to support either electrical or electronic components for the system. Slots 14 include slot 17 suitably sized to permit insertion of matrix board 7 therein.

Referring particularly to FIG. 8, there is shown matrix board 7 including a grid system of holes cut in board 7. The grid system may be numbered as an ordinate number 81 and abscissa number 83 to permit specification of the position to place components for insertion. These numbers, while shown in FIG. 8, do not appear on the board but are used in prints of the board for proper hole identification. Typical dimensions for board 7 are twenty inches in horizontal length 80 and sixteen inches in vertical length 82 for displays of the same dimensions. A horizontal margin 84 such as 1.15 inches and a vertical margin 86 such as 0.95 inches from the end of board 7 may be provided. The holes 88 of board 7 are sized to permit the insertion of pressure fit actuated wire wrap pin connectors inserted into holes 88 to support the components and permit electrical connection.

Typically, holes 88 are grouped a distance 92, such as 0.3 inches, apart horizontally and a distance 94, such as 0.1 inches, apart vertically to permit the use of dual-in-line components. Typically, the location of components such as light emitting diodes can be specified by grid numbers such as pin A-60 and pin B-60 where "A" and "B" are the ordinate numbers 81 and "60" is the Abscissa number 83. Also, pin wiring for wire wrap terminals may be specified by grid numbers such as pin C-59 to pin D-58 where "C" and "D" are the ordinate numbers 81 and "59" and "58" are the abscissa numbers 83. Ordinate number 81 may follow a letter segment corresponding to typical edge connectors if desired.

The light sources usually connected to matrix board 7 include light emitting diodes. The light emitting diodes low heat dissipation and concentrated light output allow high display density without light dispersion and without the need for forced cooling. The long life of light emitting diode lamps all but eliminates the need for lamp replacement. Colors available for the light emitting diodes include orange, yellow, red, green and dual (red and green).

Other equipment (not shown) which may be mounted on matrix board 7 include magnetic responsive switches, serial to parallel converters, parallel to serial converters, analog to digital converters, digital to analog converters, memory (both read and write and read only) including being used for multiplex addressings, annunciators, flashers, and interlocks. The interlocks may be between light sources and may be accomplished by solid state technology or otherwise to drive the light sources. Alphanumeric displays, having digit size such as one-eighth inch to one-half inch, may also be mounted on board 7 and driven by electronic components also located on board 7.

Referring to FIGS. 1-6 connectors (not shown) may also be located on matrix board 7 for direct connect through holes (not shown) in the back 13, side 12, or bottom 11 of frame 10 to interface to external power supplies, inputs, outputs and other external signals and devices. Alternately, connectors may be located directly on the back 13, side 12, or bottom 11 of frame 10. Also, connectors may be located on both matrix board 7 and on back 13, side 12, or bottom 11 of frame 10 to interconnect with each other, permitting the connector located on the frame 10 to interface to such external signals and devices.

A photocell 5 may be, for example, mounted on frame 10 to sense ambient light and change the light intensity of the light emitting diodes or other light sources.

Plates 16 further include means for substantially preventing incident light from being reflected, means for protecting the electronic components on matrix board 7 and means for displaying semi-graphic material. They may also include switches, and push buttons, including acknowledgement push buttons, and magnets moveable to different positions for switch actuation.

In assembling and using the graphic display, the semi-graphics, if any, are determined from the information formation and equipment to be depicted and imposed on the plates 16 by silk screening, painting, or other suitable means. The data to be processed and displayed is also determined and specified by electrical layout on matrix board 7 by specifying electrical and electronic components by ordinate 81 and abscissa 83 locations and inter connection. Light sources are located in alignment with transparent positions on the semi-graphic display where information to be displayed. For this purpose, mylar print of matrix board 7 may be used with a proportionately sized semi-graphic overlay during the electrical layout to locate the appropriate ordinate and abscissa positions for light sources.

After assembly of frame 10 and construction of plates 16, plates 16 are inserted into slots 14 of frame 10 and frame 10 is secured, if necessary, to another structure. Connection is made from matrix board 7 to external sources of power, inputs, outputs and other external signals and devices. Top cover 72 is placed on frame 10 to secure plates 16.

Upon operation, an operator viewing the graphic display will see the light sources present information as to state and/or value of inputs and outputs and other signals or calculated values in the appropriate locations of the semi-grapic depiction of the process or equipment. In this manner, an operator can ascertain the present status and value of the variables associated with equipment or processes from the graphic display system. He can also react, through switches, push buttons, and magnets to take action directly through the graphic display system.

Referring particularly to FIGS. 1 and 2, there is shown the graphic display system of the first embodiment with plates 16 comprising circular polarizer 18 and front transparent sheet 20.

The front transparent sheet 20 may be non-glare plexiglass or glass or other suitable material for protecting the components located on matrix board 7. Sheet 20 may have an overlay on either side in a single or in multiple colors to semi-graphically portray equipment or other material. The color overlays may be made by single or multiple silk screening or other suitable process with suitable sized transparent areas left to permit the passage of light from the light emitting diodes or other light sources mounted on matrix board 7.

The properties of circular polarizer 18 are well known in the art, see U.S. Pat. No. 2,334,418. It is used in the graphic display to prevent incident light passing through front transparent cover 20 from being substantially reflected thereby preventing glare.

Slots 14 include slots 19 and 21, suitably sized to permit insertion of front cover 20 and circular polarizer 18 respectively therein.

Cover 20 is located in front of circular polarizer 18 which is located in front of matrix board 7.

Referring particularly to FIGS. 3 and 4, there is shown the graphic display system of the second embodiment wherein slots 14 include slot 36 which is sized, such as 0.175 inches wide, sufficiently to permit insertion of both the plexiglass or other front transparent sheet 20 and the circular polarizer 18 within the same slot. In this manner, the parallax problem incurred by spacing the transparent front cover 20 and polarizer 18 apart is greatly reduced. Also, sides 12 further include bevels 32, 34 at the front outward edges.

Referring particularly to FIGS. 5 and 6, there is shown the graphic display system of the third embodiment wherein no circular polarizer is used. The transparent cover 20 of non-glare plexiglass or other material is covered by silk screening or other appropriate process in black 50 or other opaque color on, for example, the reverse side. Coating 50 is specified to leave transparent portions at the positions and in the shapes of the figures of semi-graphic display. Holes 49 may be cut in the transparent front cover at those positions where light emitting diodes 51 or other light sources are to be located on the matrix board 7, if desired.

The appropriate colors for the figures of the semi-graphic portion of the display can be quickly and easily applied to the appropriate figures after the silk screening or other process by painting or other technique or may be hand-painted using various methods such as air brush, or even color tape. The black silk screen prevents any inaccuracy in not following the lines of the semi-graphic transparent portion evidenced by paint or other flow over onto the opaque silk screen from showing on the front of the display.

The black or opaque background and painting of substantially all of the rest of the cover 20 prevents any incident light of significant proportion from being admitted to be reflected for glare. Contrast is maximized by the black background while maintaining high resolution. This process of coloring the transparent front cover 20 yields a high density, multicolor, high resolution display.

In this third embodiment matrix board 7 is mounted in slot 17 substantially close to the front transparent plate 20 so that the light sources are juxtaposed with the holes in the transparent member 20.

As another preferred alternative in place of holes in transparent cover 20 of embodiment 3, the areas where the light sources must be visible may be masked prior to painting.

Slot 14 includes slot 52 suitably sized to receive transparent plate 20 and suitably located with respect to slot 17 to permit juxtaposition of the components on matrix board 7 with the areas where the light source must be visible on plate 20.

Although the system described in detail supra has been found to be most satisfactory and preferred, many variations in structure and method are possible. For example, modems may be incorporated on matrix board 7. Additionally, the graphic display may be colored in any manner. The above are merely exemplary of the possible changes or variations.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in a limiting sense.

What is claimed as invention is:

1. A grapic display system for displaying electrical signals by light sources in the presence of an external lighting system, comprising:
   a frame;

a set of plates; one of said plates having
means for supporting such light sources;
means for connecting said plates to said frame;
means for connecting such light sources to such electrical signals; and
said plates including glare means for preventing substantial reflection of incident light on one plate from said external lighting.

2. The graphic display system of claim 1, wherein said glare means includes:
a transparent plate; and
a circular polarizer plate.

3. The graphic display system of claim 2, wherein said transparent plate has non-glare characteristics.

4. The graphic display system of claim 2, wherein said transparent plate and said circular polarizer plate are juxtaposed.

5. The graphic display system of claim 1, wherein said one of said plates includes means for supporting electronic components thereon to drive such light sources.

6. The graphic display system of claim 1, wherein said one of said plates includes means for locating such light sources at substantially any position on said one of said plates.

7. The graphic display system of claim 1, wherein said one of said plates is substantially flat.

8. The graphic display system of claim 1, wherein said glare means includes means for supporting and displaying semi-graphic information.

9. The graphic display system of claim 1, wherein the depth of said frame is substantially thin as compared to the width and height of the display.

10. The graphic display system of claim 1, wherein the depth of said frame is less than two inches and wherein the width and height of the display are substantially greater than the deth.

11. The graphic display system of claim 1, wherein the system is to be mounted on an external surface and said frame further includes means for mounting said frame on such external surface.

12. The graphic display system of claim 1, wherein there is further included photo cell means for adjusting the intensity of such light sources in proportion to the intensity of such external lighting.

13. A graphic display for processing electrical signals and displaying the results by light sources, comprising:
a frame;
a set of plates;
means for holding said plates in said frame;
one of said plates permitting light to pass only at discrete positions and having semi-graphic figures in proximate relationship with said discrete positions;
a second of said plates including means for supporting such light sources thereon in alignment with said discrete positions, such light sources being supported from the surface of said second of said plates substantially free of obstructions therebetween, the location of such light sources being fixed only by the location of said discrete positions, processing means for processing such electrical signals, and means for connecting said processing means to such electrical signals.

14. The graphic display system of claim 13 wherein said second plate is substantially flat and having a matrix of holes therethrough.

15. In a display system having a frame and using semi-graphics for displaying data gathered from electrical signals in relation to the semi-graphics and for mounting on an external substantially flat surface, the improvement comprising:
first means in such frame for converting the electrical signals to light while limiting the wattage produced thereby to value below that required for forced cooling and;
second means in such frame for mounting said first means thereon, said second means including a substantially flat plate with holes therethrough sized to receive said first means therein; and
third means for mounting such frame on such substantially flat surface.

16. A method of constructing a semi-graphic display plate from a transparent plate, comprising:
A. covering the plate with a flat substantially opaque material on one of its sides except for the outlines of semi-graphic figures; and then
B. coloring the outlines of the semi-graphic figures on the same side as the first opaque material with additional substantially opaque material;
C. permitting the additional opaque material to cover portions of the first opaque material.

17. The method of claim 16 wherein Step B further includes leaving substantially transparent regions in the additional opaque material within such outlines of such semi-graphic figures.

18. A display plate for displaying a semi-graphic outline, comprising:
a transparent plate;
first opaque means for substantially opaquely covering one side of said transparent plate except for such semi-graphic outline;
second opaque means on said same side of said transparent plate as said first opaque means for covering substantially opaquely such semi-graphic outline on said transparent plate and a portion of said first opaque means.

19. The display plate of claim 18 wherein said second opaque means includes transparent portions thereon.

20. The display plate of claim 18 wherein said transparent plate includes openings on the portion thereof having such semi-graphic outline for the passage of light therethrough.

* * * * *